United States Patent
Zhang et al.

(10) Patent No.: US 10,656,051 B2
(45) Date of Patent: May 19, 2020

(54) SYSTEM AND METHOD FOR DETECTING WEAR OR FAILURE OF GENSET POWER SYSTEM COUPLING

(71) Applicant: Caterpillar Inc., Peoria, IL (US)

(72) Inventors: Yanchai Zhang, Dunlap, IL (US); Maurice Dust, Edwards, IL (US); Perry D Converse, Lafayette, IN (US); Xuefei Hu, Dunlap, IL (US); Yong Sun, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 327 days.

(21) Appl. No.: 15/660,081

(22) Filed: Jul. 26, 2017

(65) Prior Publication Data

US 2019/0033171 A1     Jan. 31, 2019

(51) Int. Cl.

| G01M 15/12 | (2006.01) |
| F02D 41/22 | (2006.01) |
| G01M 13/022 | (2019.01) |
| F02D 29/06 | (2006.01) |
| G01M 13/028 | (2019.01) |
| F02B 63/04 | (2006.01) |
| F02D 41/14 | (2006.01) |

(Continued)

(52) U.S. Cl.
CPC ............ *G01M 15/12* (2013.01); *F02D 29/06* (2013.01); *F02D 41/22* (2013.01); *G01M 13/022* (2013.01); *G01M 13/028* (2013.01); *F02B 63/04* (2013.01); *F02B 77/083* (2013.01); *F02D 2041/1433* (2013.01); *F02D 2041/1437* (2013.01); *F02D 2041/288* (2013.01)

(58) Field of Classification Search
CPC ................. F02B 77/083; F02D 41/22; F02D 2041/1433; F02D 2041/1437; F02D 2041/288; G01M 15/12; G01M 13/022; G01M 13/028; G01N 29/12; G01N 29/4427; G01N 29/4472; G01N 29/46; G05B 23/0289; H02K 11/20; H02K 7/1815

See application file for complete search history.

(56) References Cited

U.S. PATENT DOCUMENTS

| 6,722,450 | B2 | 4/2004 | Schultz |
| 8,994,359 | B2 | 3/2015 | Neti |
| 9,092,802 | B1 * | 7/2015 | Akella ............... G06Q 30/0256 |

(Continued)

*Primary Examiner* — Elias Desta
(74) *Attorney, Agent, or Firm* — Gutwein Law (57) ABSTRACT

A system for detecting wear or failure of a genset coupling of a genset power system is provided. The system includes a vibration sensor for measuring vibrations, and an additional sensor for measuring an operating condition. A controller is configured to process operating condition data from the additional sensor using a modeling software to generate simulated data. The controller applies time domain information of at least one of the simulated data and vibration sensor data to the modeling software using a machine learning algorithm, and perform a comparison to identify wear or failure of the coupling, wherein, when performing the comparison, the controller compares at least one of: time domain information of the vibration sensor data to time domain information of the simulated data or frequency domain information of the vibration sensor data to frequency domain information of the simulated data, to identify wear or failure of the coupling.

20 Claims, 7 Drawing Sheets

(51) Int. Cl.
*F02B 77/08* (2006.01)
*F02D 41/28* (2006.01)

(56) References Cited

U.S. PATENT DOCUMENTS 9,401,178 B2 * 7/2016 Bentley .................. H04N 7/181
9,751,534 B2 * 9/2017 Fung ..................... B60W 40/08

* cited by examiner

SYSTEM AND METHOD FOR DETECTING WEAR OR FAILURE OF GENSET POWER SYSTEM COUPLING

TECHNICAL FIELD

The present disclosure relates generally to detection of wear or failure of a genset power system coupling and, more particularly, to model-based detection including machine learning.

BACKGROUND

An engine-driven generator, commonly referred to as a genset or a genset power system, is the combination of an engine (such as a diesel-powered or gas-powered internal combustion engine) with a generator (such as an alternator) to generate electrical power. That is, the engine may generate a mechanical power output, and the generator may be coupled to the engine to convert at least a portion of the mechanical power output to electrical power. According to an example, a diesel internal combustion engine may provide the mechanical power output in a genset, and may be designed to run on conventional fuels, or may be adapted for use with other liquid fuels or natural gas. Gensets may be used for prime, continuous, or standby power, and may be implemented in various applications, including applications using single gensets and applications using a plurality of gensets, such as to provide redundancy and/or load sharing.

Excessive loading, and/or other undesirable operating conditions, of a genset can cause vibrations, which may result in undesirable effects on components of the genset. For example, excessive loading may cause premature wear or failure of genset components, which may result in unplanned downtime for the genset. Thus, to optimize operation thereof, it may be desirable to accurately and effectively detect or predict the occurrence of various abnormal operating conditions of the genset, which may result in undesirable effects on genset components, such that actions may be taken to reduce the undesirable effects on the genset.

U.S. Pat. No. 8,994,359 to Neti et al. (hereinafter "Neti") discloses a method of detecting faults in a wind turbine generator based on current signature analysis. In particular, electrical signals representative of operating conditions of the wind turbine generator are processed to generate a normalized spectrum of electrical signals. A fault related to a generator component is detected by analyzing the normalized spectrum.

SUMMARY OF THE INVENTION

In one aspect, a system for detecting wear or failure of a genset coupling of a genset power system is provided. The genset power system includes an engine, a generator, and a coupling between the engine and the generator. The system also includes a vibration sensor configured to measure vibrations of the genset power system, and an additional sensor including one of a speed sensor, temperature sensor, and pressure sensor, configured to measure an operating condition of the genset power system. A controller is configured to receive vibration sensor data from the vibration sensor, receive operating condition data from the additional sensor, and process the operating condition data using a modeling software to generate simulated data. The controller is also configured to apply time domain information of at least one of the simulated data and the vibration sensor data to the modeling software using a machine learning algorithm, and perform a comparison to identify the wear or failure of the coupling, wherein, when performing the comparison, the controller is to compare at least one of: time domain information of the vibration sensor data to time domain information of the simulated data, or frequency domain information of the vibration sensor data to frequency domain information of the simulated data, to identify the wear or failure of the coupling.

In another aspect, a method for detecting wear or failure of a genset coupling of a genset power system is provided. The genset power system includes an engine, a generator, and a coupling between the engine and the generator. The method includes receiving, at a controller, vibration sensor data from a vibration sensor, and operating condition data from an additional sensor that includes one of a speed sensor, temperature sensor, and pressure sensor. The controller processes the operating condition data using a modeling software to generate simulated data. Time domain information of at least one of the simulated data and the vibration sensor data is applied to the modeling software using a machine learning algorithm. The controller also performs a comparison to identify the wear or failure of the coupling, wherein, when performing the comparison, the controller is to compare at least one of: time domain information of the vibration sensor data to time domain information of the simulated data, or frequency domain information of the vibration sensor data to frequency domain information of the simulated data, to identify the wear or failure of the coupling.

In yet another aspect, a control system for detecting wear or failure of a genset coupling of a genset power system is provided. The genset power system includes an engine, a generator, and a coupling between the engine and the generator. The control system includes a controller configured to receive vibration sensor data from the vibration sensor configured to measure vibrations of the genset power system, receive operating condition data from an additional sensor configured to measure an operating condition of the genset power system, and process the operating condition data using a modeling software to generate simulated data. The controller is also configured to apply time domain information of at least one of the simulated data and the vibration sensor data to the modeling software using a machine learning algorithm, and perform a comparison to identify the wear or failure of the coupling, wherein when performing the comparison, the controller is to compare at least one of: time domain information of the vibration sensor data to time domain information of the simulated data, or frequency domain information of the vibration sensor data to frequency domain information of the simulated data, to identify the wear or failure of the coupling.

DETAILED DESCRIPTION

Figure 1:
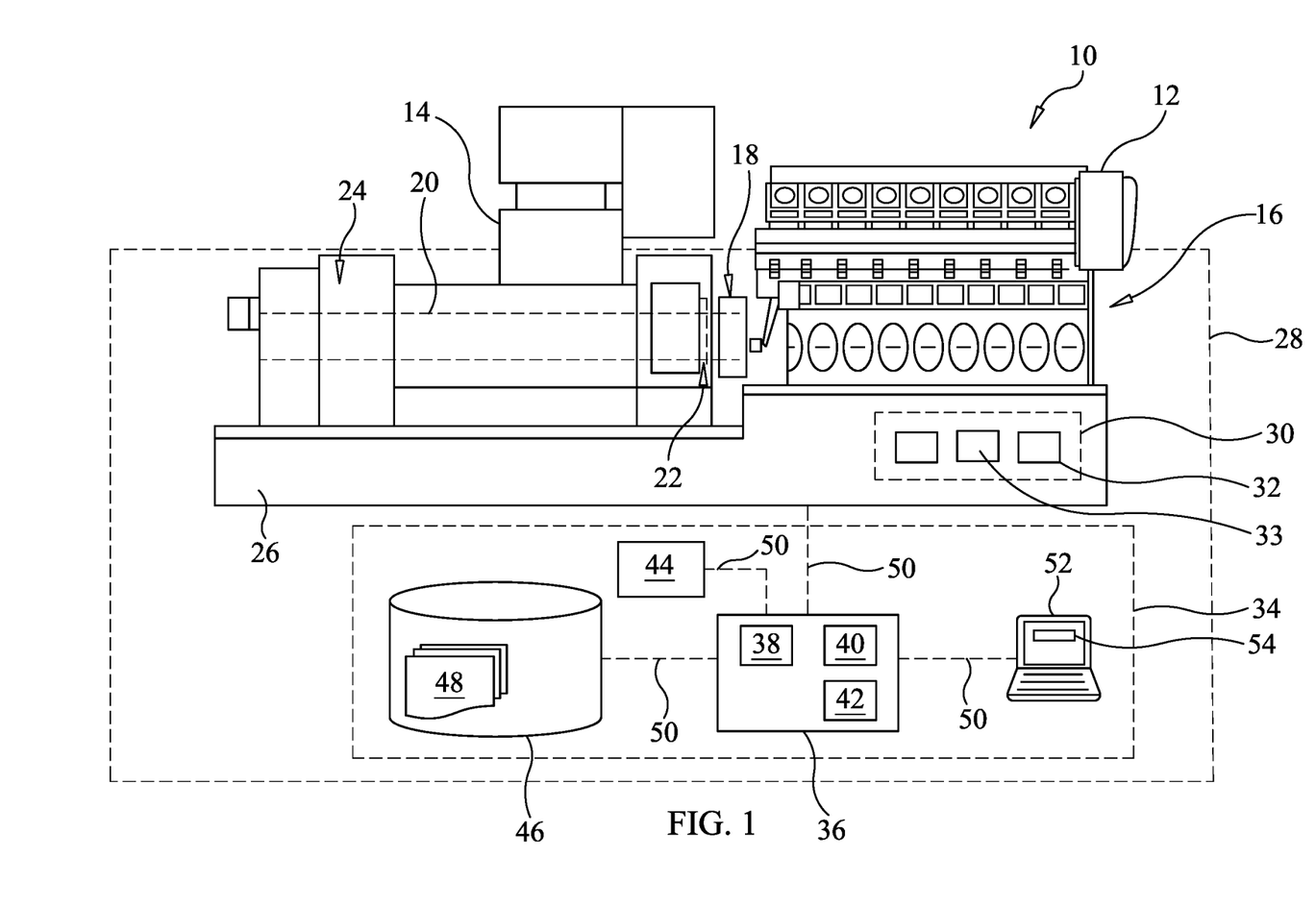
FIG. 1 is a schematic diagram of an exemplary genset power system and a system for detecting wear or failure of a genset coupling of the genset power system, according to an exemplary embodiment of the present disclosure.

An exemplary genset power system 10 according to the present disclosure is shown generally in FIG. 1. The genset power system 10 may include any component or components that operate to generate electrical power for a load (not shown). The load may include any type of power consuming system or device configured to receive and/or utilize electrical power to perform some type of work or task. The genset power system 10 may be used for prime, continuous, or standby power, and may be implemented in various applications, including applications using single gensets and applications using a plurality of gensets, such as applications requiring redundancy and/or load sharing.

The genset power system 10 may include an engine 12 drivingly coupled to a generator 14. The engine 12 may be any of a variety of known engines configured to produce mechanical power and, for example, may include an internal combustion engine such as a diesel-powered or gasoline-powered engine. As should be appreciated by those skilled in the art, the engine 12 may include a plurality of cylinders, each having a piston connected to a common crankshaft 16. The engine 12, or crankshaft 16, may be mechanically coupled to the generator 14 via a coupling, or genset coupling, 18.

The generator 14 may be any type of known device configured to receive mechanical power from the engine 12, by way of the coupling 18, and convert at least a portion of the mechanical power into electrical power, in known ways. For example, the generator 14 may be a variable-frequency alternating current generator, a fixed frequency alternating current generator, an induction generator, a permanent-magnet generator, a switched-reluctance generator, and/or any other type of generator. That is, a rotor 20, which is a moving component of the generator 14, may produce a rotating magnetic field in one of various ways, such as, for example, by induction, by permanent magnets, or by using an exciter. Among other additional components, the generator 14 may also include a front bearing 22 and a rear bearing 24, for use, to constrain relative motion and reduce friction between moving parts.

The genset power system 10 may be mounted, or otherwise supported, on a structural support, such as a vibration isolation mount 26. The vibration isolation mount 26 may function as a vibration isolator and a shock mount for the genset power system 10 and various components thereof. The genset power system 10 may include various additional components, as will be appreciated by those skilled in the art, such as, for example, a fuel system, a voltage regulator, cooling and exhaust systems, and a lubrication system, to name a few.

A system for detecting wear or failure of the coupling 18 of the genset power system 10, according to the present disclosure, is shown generally at 28. As illustrated, the system 28 may include one or more components of the genset power system 10. For example, the system 28 may include various sensors 30 that may be mounted on the genset power system 10 and used to monitor and/or control operation of the genset power system 10. According to one example, the system 28 may include, or may communicate with, at least one vibration sensor 32, such as an accelerometer, configured to measure vibrations of the genset power system 10. The system 28 may also include at least one additional sensor 33, which may be configured to measure an operating condition of the genset power system 10. The additional sensor 33 may include at least one of a speed sensor, temperature sensor, and pressure sensor. It should be appreciated that the sensors 30 of the genset power system 10 may include various other sensors, including, for example, various other vibration sensors, speed sensors, pressure sensors, temperature sensors, and the like.

The system 28 may also include a control system 34, including a controller 36, for electronically monitoring and/or controlling the various machine systems and components. The controller 36 may include a processor 38, such as, for example, a high frequency processor, a memory 40, and an input/output circuit that facilitates communication internal and external to the controller 36. The processor 38, for example, may control operation of the controller 36 by executing operating instructions, such as, for example, computer readable program code 42 stored in the memory 40, wherein operations may be initiated internally or externally to the controller 36.

Control schemes may be utilized that monitor outputs of systems or devices, such as, for example, sensors (e.g., sensors 30 introduced above), actuators, or control units, via the input/output circuit to control inputs to various other systems or devices. Memory 40, as used herein, may comprise temporary storage areas, such as, for example, cache, virtual memory, or random-access memory, or permanent storage areas, such as, for example, read-only memory, removable drives, network/internet storage, hard drives, flash memory, memory sticks, or any other volatile or non-volatile data storage devices. One skilled in the art will appreciate that any computer based system or device, utilizing similar components for controlling the machine systems or components described herein, is suitable for use with the present disclosure.

According to the present disclosure, the control system 34 may include or access modeling software 44 for performing a variety of functions or tasks. For example, the modeling software 44 may represent a set of software modules or programs for processing data, monitoring operations, and/or performing simulations using mathematical models. According to the present disclosure, the modeling software 44 may be used to assist in detecting wear or failure of the coupling 18 of the genset power system 10, as will be described below. Algorithms, models, and the like, which may be utilized and/or generated by the modeling software 44 may be stored in memory 40, or another electronic storage device.

The control system 34 may also include or access a database 46. The database 46, and/or memory 40, may be accessed by the controller 36, and other systems or devices, to implement various monitoring and/or control strategies for the genset power system 10. According to some embodiments, the controller 36 may utilize models 48, generated by the modeling software 44, and/or other data to perform various functions or tasks, including assisting in detecting abnormal operating conditions of genset power system components, such as the coupling 18. As indicated above, models 48 may be stored in memory 40. Additionally, or alternatively, models 48 may be stored in the database 46. According to the exemplary embodiment, models 48 may include a normal performance model and an abnormal performance model, both of which will be described below.

The controller 36 may be configured to communicate with the database 46, the modeling software 44, and various components of the genset power system 10 including, for example, the vibration sensor 32 and the additional sensor 33, via wired and/or wireless communication lines 50. The controller 36 may also communicate with an operator interface 52, via communication lines 50, through which an operator may monitor and/or control one or more aspects of the operation of the genset power system 10 and/or system 28. According to a specific example, the operator interface 52 may generate, and communicate or display, a message 54, generated by the controller 36, corresponding to wear or failure of the coupling 18, as detected by the system 28. The message 54 may be stored or logged in the memory 40 or database 46, for example. The message 54 may communicate a problem or potential problem with a component of the genset power system 10. In response, various actions may be taken. For example, maintenance/repair may be initiated, the genset power system 10 may be shut down or taken off-line, and/or a costly failure may be avoided.

Figure 2:
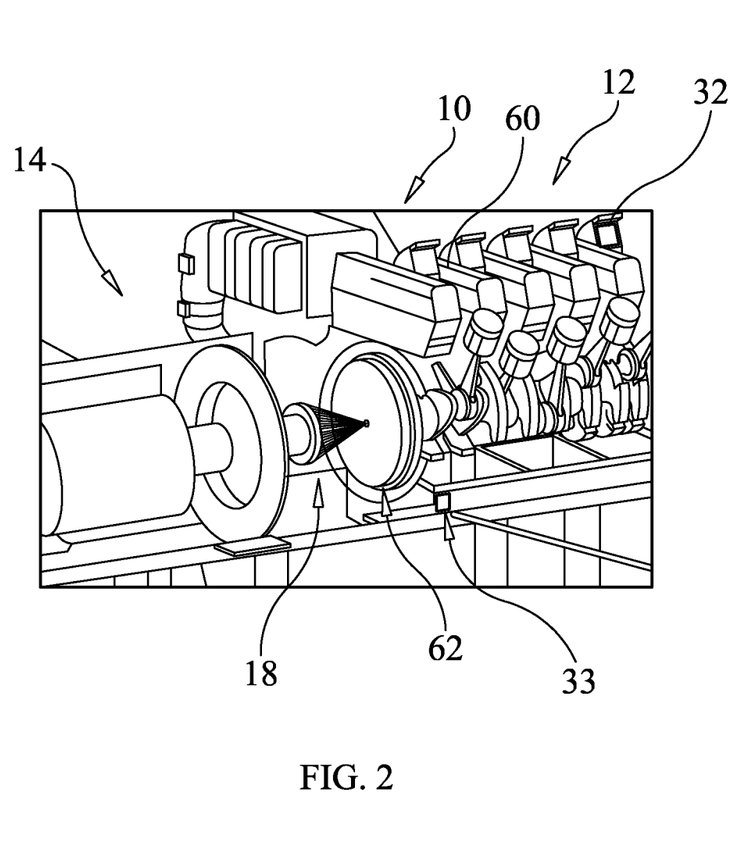
FIG. 2 illustrates mounting locations for a vibration sensor and an additional sensor, according to one aspect of the present disclosure.

According to a specific example of the present disclosure, and referring also to FIG. 2, the controller 36 may be programmed to identify wear or failure of the coupling 18 of the genset power system 10. According to one embodiment, the vibration sensor 32, which may be an accelerometer, may be mounted on or near an engine block 60 of the engine 12, or at another location. The additional sensor 33 may be mounted at a location for measuring an operating condition of the genset power system 10. As stated above, the vibration sensor 32 may be configured to measure vibrations of the genset power system 10, or specific components thereof, and the additional sensor 33 may be configured to measure operating conditions of the genset power system 10. The signals, or sensor data, generated by the vibration sensor 32 and the additional sensor 33, along with additional information, may be utilized by the controller 36 to identify wear or failure of the coupling 18, as described herein.

Figure 3:
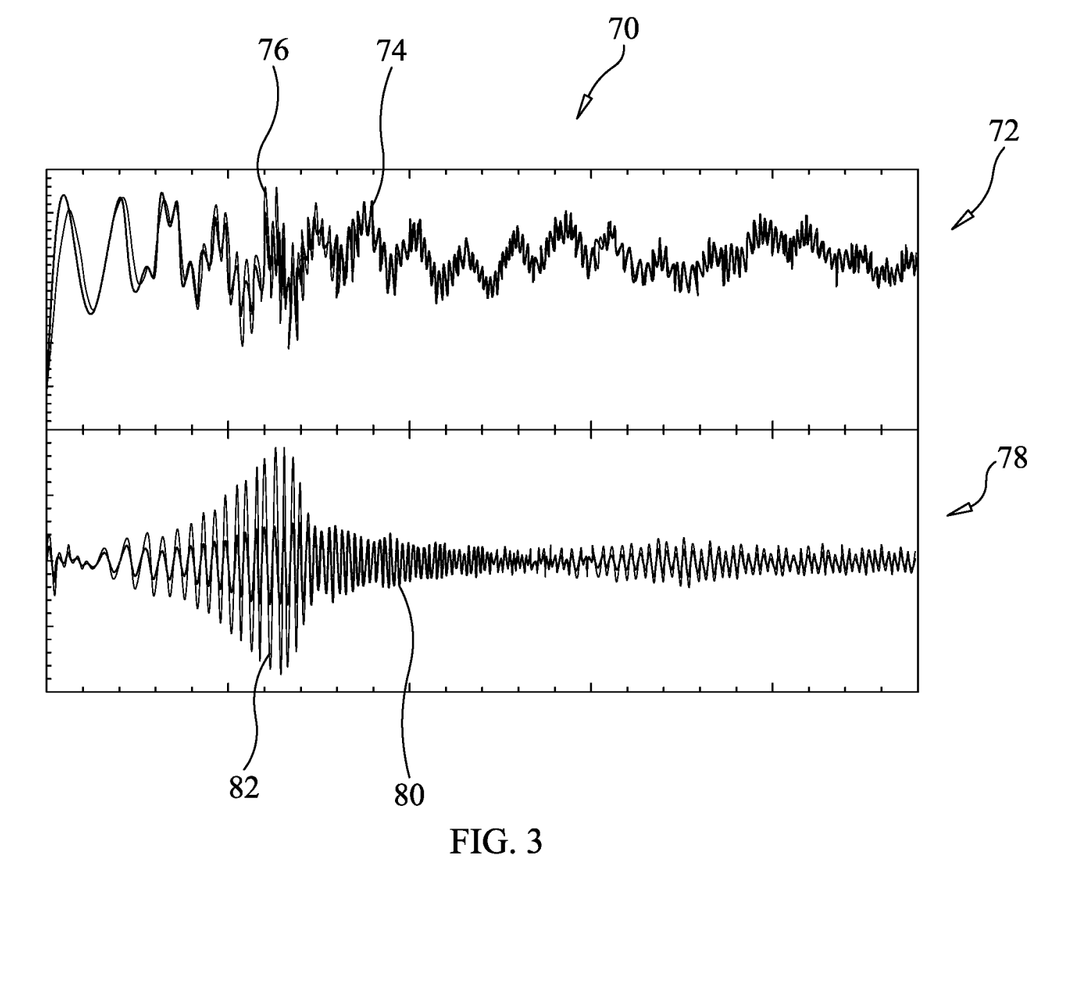
FIG. 3 includes charts depicting exemplary vibration sensor data and simulated data corresponding to normal performance and abnormal performance, according to another aspect of the present disclosure.

Turning now to FIG. 3, a set of charts 70 illustrating normal performance data and abnormal performance data corresponding to the coupling 18 are shown. A first chart 72 depicts exemplary vibration sensor data, which may be received from the vibration sensor 32, and may include a first curve 74 corresponding to normal performance of the coupling 18 and a second curve 76 corresponding to abnormal performance of the coupling 18. Similarly, a second chart 78 depicts exemplary vibration sensor data, and includes a first curve 80 corresponding to normal performance of the coupling 18 and a second curve 82 corresponding to abnormal performance of the coupling 18. The first chart 72 represents vibrations measured at or near the engine block 60, while the second chart 78 represents vibrations measured at or near the flywheel 62.

This data may be used for various purposes, including for determining one or more mounting locations for identifying wear or failure of the coupling 18. The mounting location(s) may be identified through testing and analysis. That is, for example, a mounting location for detecting wear or failure of the coupling 18 may be selected by analyzing data from sensors at different mounting locations and identifying the one providing the greatest indication of wear or failure for the coupling 18. Additionally, or alternatively, this data may be representative of training data used by the modeling software 44.

Figure 4:
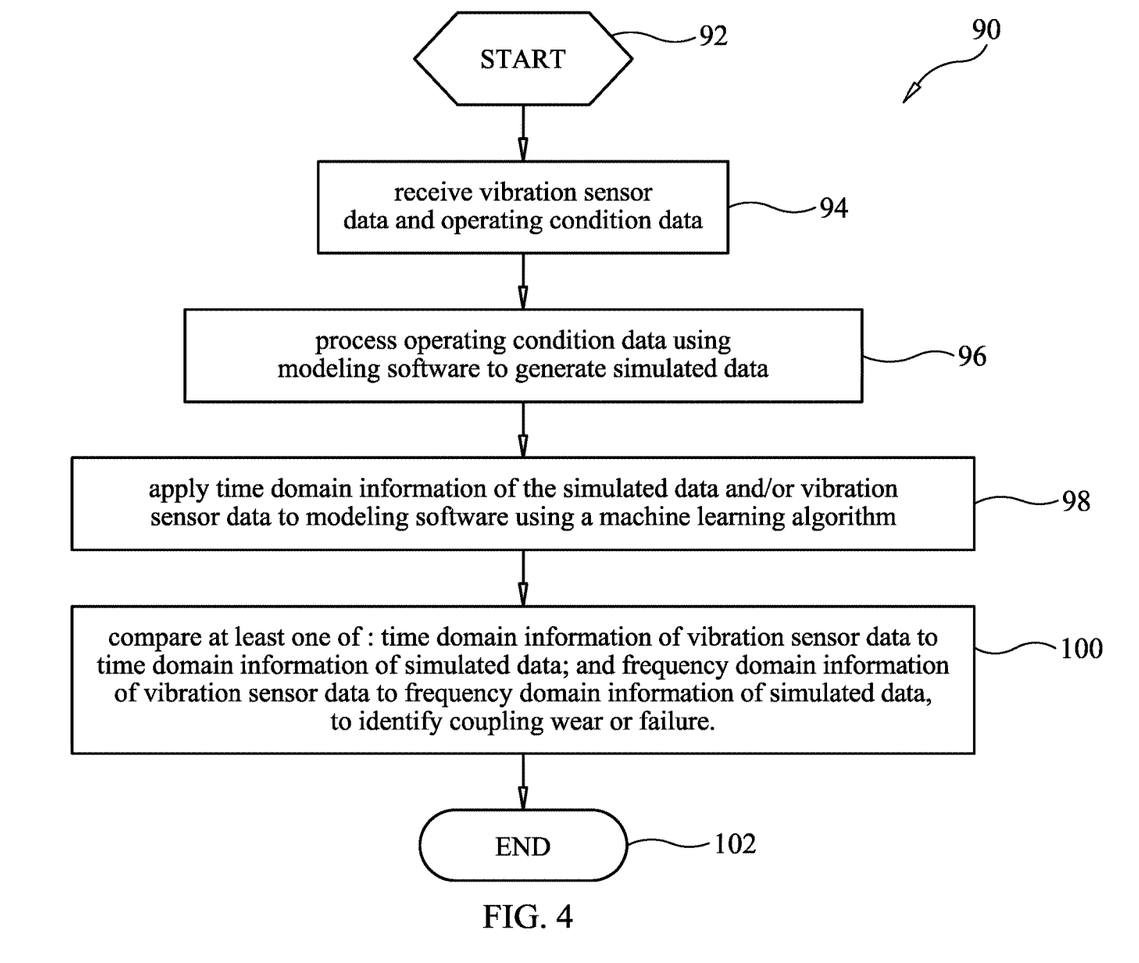
FIG. 4 is a flow diagram representing an exemplary method for detecting wear or failure of a genset coupling of the genset power system of FIG. 1.

The controller 36 may communicate with the vibration sensor 32 and the additional sensor 33, and other components of the genset power system 10, and may be programmed to identify wear or failure of the coupling 18 of the genset power system 10, according to methods disclosed herein, the primary steps of which are illustrated in a flow diagram 90 of FIG. 4. The method, the steps of which may be performed in an alternative order, may be implemented in whole or in part by the controller 36 and may run, or execute, continuously or intermittently. The method may begin at a START, at box 92, and proceed to box 94.

According to the exemplary embodiment, vibration sensor data may be generated by the vibration sensor 32 and operating condition data may be generated by the additional sensor 33, such as during operation of the genset power system 10, and may be received at the controller 36, at box 94. For example, vibration sensor data, which may be in the form of time domain data, may be transmitted from the vibration sensor 32 to the controller 36 via communication lines 50 and, similarly, operating condition data, which may be in the form of time domain data, may be transmitted from the additional sensor 33 to the controller 36 via communication lines 50. The vibration sensor data and/or operating condition data may be received as time domain data or processed to time domain data at any time during the process.

At box 96, the operating condition data may be processed using the controller 36 and/or modeling software 44 to generate simulated data. In particular, the modeling software 44 may generate models 48, such as a normal performance model and an abnormal performance model based on the operating condition data. These models 48 may reflect or predict what vibrations might look like under normal operating conditions and abnormal operating conditions. For example, the models 48, which are generated by the modeling software 44, may include future, or predicted, vibration signals that are determined using a simplified model from finite element analysis.

Turning now to box 98, time domain information of at least one of the simulated data and/or the vibration sensor data may be applied to the modeling software 44 using machine learning and/or pattern recognition, which may incorporate the use of various algorithms. The machine learning or pattern recognition outputs may be applied to real-time model updates to increase the accuracy of the models 48 generated by the modeling software 44 for future calculations or predictions. That is, for example, the real-time simulated data and/or vibration sensor data may be used to update, or retrain, the models 48.

At box 100, at least one of the following is compared: time domain information of the vibration sensor data to time domain information of the simulated data, which includes the normal performance model and the abnormal performance model; and frequency domain information of the vibration sensor data to frequency domain information of the simulated data, to identify wear or failure of the coupling 18. All of the data, including results of the comparisons, may be stored in the memory 40 and/or database 46.

Processing of the simulated data and/or vibration sensor data may include one or more of noise filtering, signal conditioning, frequency filtering and/or signal transformations. According to some embodiments, the simulated data and/or vibration sensor data may be filtered, or further filtered, using frequency-based filtering to arrive at filtered data. That is, the simulated data and/or vibration sensor data may be band-pass filtered to remove frequencies outside a range of interest, or wavelet analysis may be used to divide a given function or signal into different scale components. Frequency domain information of the filtered vibration data may be compared to the filtered simulated data, which may represent threshold data, to identify the coupling wear or failure.

According to some embodiments, peak to peak values of the frequency domain information of the filtered vibration data may be calculated and compared with frequency domain information of the filtered simulated data to identify wear or failure of the coupling 18. A peak to peak value, or a difference between the maximum positive and maximum negative amplitudes, may be greatest from vibration data from sensors at or near the coupling 18 during an abnormal operating condition. Peak to peak values of the time domain information of the vibration sensor data may additionally or alternatively be compared to time domain information of the simulated data, which may represent threshold data, to identify coupling wear or failure. After an assessment of the coupling 18 is made, the method may proceed to an END, at box 102.

Figure 5:
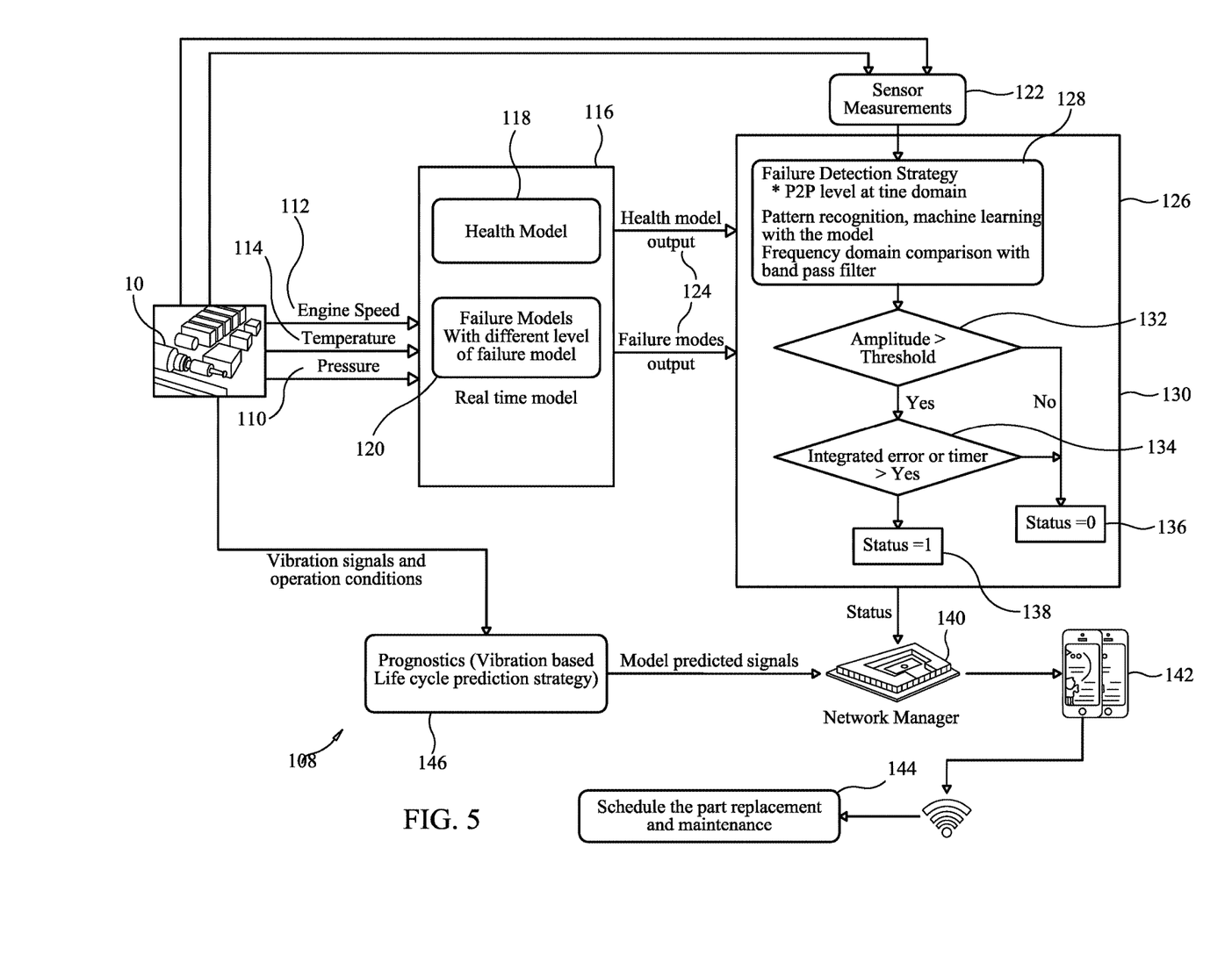
FIG. 5 is a block diagram further illustrating the exemplary method of FIG. 4, according to the exemplary disclosure.

Turning now to FIG. 5, the exemplary method of FIG. 4 is illustrated using a block diagram 108. Pressure sensor data, or signals, 110 and speed sensor data, or signals, 112, along with temperature sensor data 114 and/or other data or signals, may be generated by the genset power system 10. The pressure sensor data 110, speed sensor data 112, and temperature sensor data 114, which may correspond to the operating condition data generated by the operating condition sensor 33, may be received at block 116 and processed by the controller 36 and/or modeling software 44.

For example, the pressure sensor data 110, speed sensor data 112, and temperature sensor data 114 may be inputs into a normal performance model 118 and an abnormal performance model 120, which may both be generated or provided by the modeling software 44 or other software. That is, the normal performance model 118 and the abnormal performance model 120 may be created, trained and/or re-trained using the pressure sensor data 110, speed sensor data 112, and temperature sensor data 114. Outputs 124 from block 116 may include simulated vibration signals corresponding to normal genset operating conditions, based on the normal performance model 118, and simulated vibration signals corresponding to abnormal genset operating conditions, based on the abnormal performance model 120. In addition, the outputs 124 may include predicted vibration signals based on use of a simplified model from finite element analysis of operation of the genset power system 10.

Sensor measurements, shown at 122, may include vibration sensor data 123. The sensor measurements 122, along with the outputs 124 from block 116, may be received as inputs to block 126. At block 126, the sensor measurements 122 and simulated vibration signals 124 may be processed in the time domain and/or the frequency domain. Time domain information of at least one of the simulated vibration signals 124 and the sensor measurements 122, which may include vibration sensor measurements, may be applied to the modeling software 44 using a machine learning algorithm or pattern recognition. For example, at block 128, the machine learning or pattern recognition outputs may be applied to real-time model updates to increase accuracy of the normal performance model 118 and the abnormal performance model 120 for future calculations or predictions.

Also at block 128, time domain information of the sensor measurements 122 may be compared to the simulated vibration signals 124 corresponding to the normal performance model 118 and the abnormal performance model 120. If the sensor measurements 122 are closer to the normal performance model 118, it may be determined that no coupling wear or failure exists. However, if the sensor measurements 122 are closer to the abnormal performance model 120, it may be determined that coupling wear or failure might exist. One or more thresholds may be selected that represent deviations from one or both of the normal performance model 118 and abnormal performance model 120. The thresholds may be selected based on research and analysis, for example, to identify an acceptable range of deviation from normal performance, and/or abnormal performance. Historical data may be used to better understand when a level of vibrations at a particular location indicates damage or failure of the coupling 18. An analysis may include comparisons of the sensor measurements 122 with the one or more thresholds.

Additionally, or alternatively, the sensor measurements 122 and the simulated vibration signals 124 may be filtered, or further filtered, using frequency-based filtering to arrive at filtered data, at block 128. That is, the sensor measurements 122 and the simulated vibration signals 124 may be band-pass filtered to remove frequencies outside a range of interest, or wavelet analysis may be used to divide a given function or signal into different scale components. Frequency domain information of the filtered sensor measurements may be compared to frequency domain information of the filtered simulated vibration signals to identify the coupling wear or failure.

According to some embodiments, peak to peak values of the frequency domain information of the filtered data, or of the time domain information, may be measured and compared to identify wear or failure of the coupling 18. Peak to peak values, or a measured distance between the maximum positive and maximum negative amplitudes, may be greatest from vibration data from sensors at or near the coupling 18 during an abnormal operating condition. The identification of the abnormal operating condition may occur if the peak to peak values reach or exceed a certain predetermined level, which may be established after research or analysis. During data analysis, for example, the engine front vertical mounting location 120 and the generator rear vertical mounting location 130 may be identified as being most sensitive to unbalance of the engine crankshaft 16 and unbalance of the generator rotor 20, respectively. Prognostics capabilities may also be available to predict wear or failure of a genset component and send an alert to the device of a user associated with the genset power system 10 based on the prediction.

As shown at block 130, the controller 36 may be configured to determine if the time domain information or frequency domain information of the sensor measurements 122 vary from the simulated vibration signals 124, which may represent and/or include threshold data, a predetermined amount for a predetermined period of time. For example, the sensor measurements 122 may be compared to the simulated vibration signals 124 or, more particularly, the abnormal performance model 120, at box 132. If the sensor measurements 122 vary from the simulated vibration signals 124 by a predetermined amount, the controller 36 may then determine, at block 134, whether the sensor measurements 122 vary by the predetermined amount for a predetermined period of time.

If the sensor measurements 122 do not vary from the simulated vibration signals 124 by the predetermined amount, or do not vary from the predetermined amount for a predetermined period of time, a status of "no" is indicated, for use by the controller 36, at block 136. If, however, the sensor measurements 122 do vary from the simulated vibration signals 124 by the predetermined amount for the predetermined period of time, a status of "yes" is generated, at box 138. The "yes" status may be indicative of wear or failure of the coupling 18 while the "no" status may be indicative of no wear or failure of the coupling 18. The different status, particularly the "yes" status, indicative of wear or failure of the coupling 18, may be transmitted to one or more devices including a device of a network manager, a device of a user associated with the genset power system 10, and/or other device, 140.

According to the exemplary embodiment, the network manager 140 may transmit a message, such as message 54, to a user device, or other device, 142. Using the user device 142, a user receiving the message 54 may schedule part replacement for the coupling 18 and/or schedule maintenance, at block 144. According to some embodiments, which may include electronic communications, part replacement or maintenance scheduling may occur automatically based on the identification of wear or failure of the coupling 18. Prognostics capabilities, at block 146, may also be available to predict wear or failure of the coupling 18 and send an alert to the one or more devices (including the device of the network manager 144) based on the prediction. Prognostics capabilities may also include a prediction of a remaining useful life of a system or component.

Figure 6:
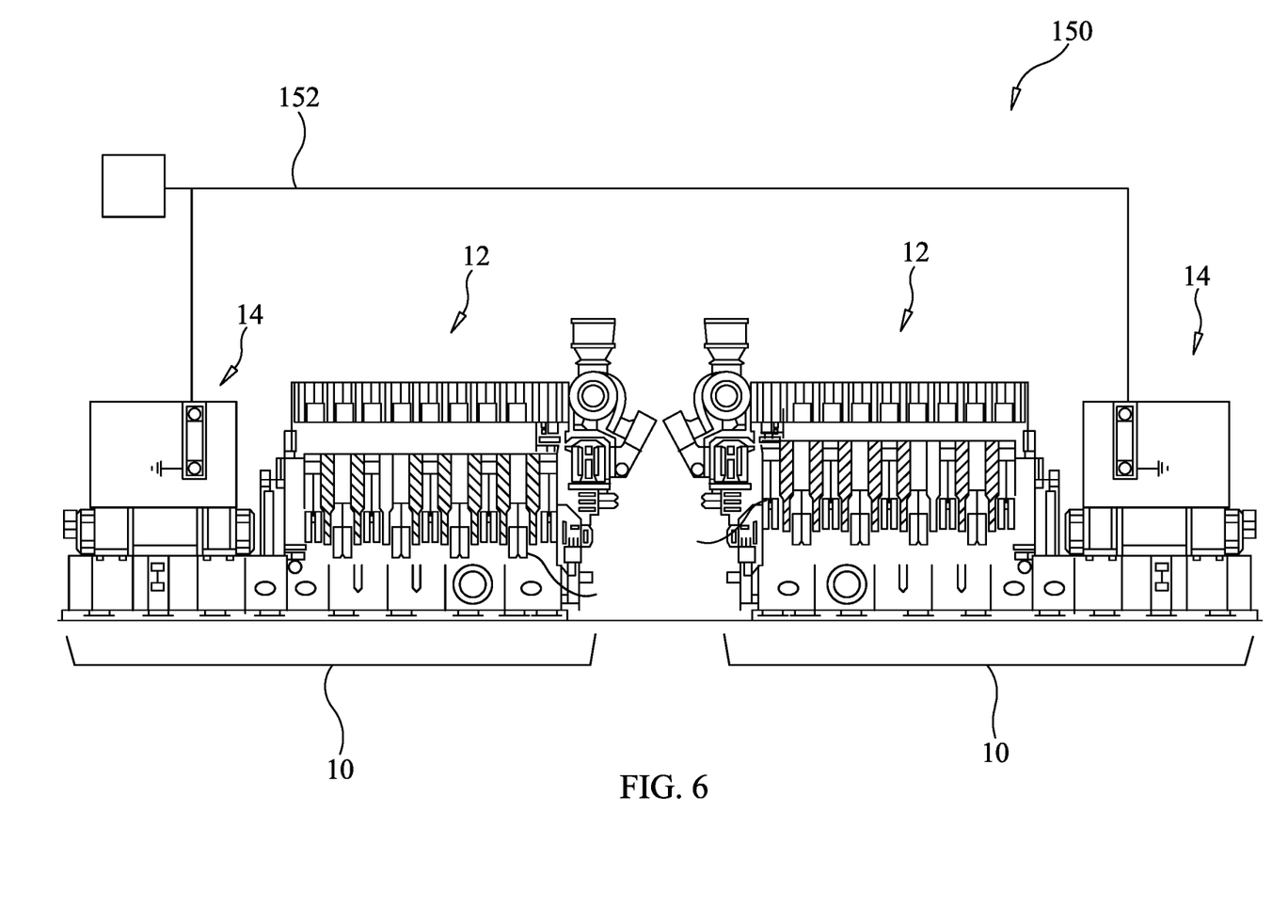
FIG. 6 illustrates a power system including a plurality of genset power systems, according to another exemplary embodiment of the present disclosure.

Turning now to FIG. 6, a power system 150 including a plurality of genset power systems 10 is shown. Although two genset power systems 10 are shown, it should be appreciated that the power system 150 may include any number of genset power systems 10. The power system 150 may be configured to supply electrical power to a load, as is known to those skilled in the art. The power system 150 may be a stationary land-based power plant, for example, or the prime mover of a mobile land or marine based machine. The power system 150 may include a power transmission network, such as a common bus 152, for transferring electrical power from the genset power systems 10 to the load.

According to the present disclosure, the controller 36 may be further programmed to apportion a particular amount of load to one genset power system 10 of the power system 150 based on the abnormal operating condition, which may be identified as described above. That is, for example, a lesser load may be apportioned to a genset power system 10 experiencing an abnormal operating condition, such as wear or failure of the coupling 18. Further, the controller 36 may be programmed to set availability of one genset power system 10 of the plurality of genset power systems 10 based on the wear or failure of the coupling 18. That is, for example, a genset power system 10 experiencing wear or failure of the coupling 18 may be identified as "unavailable" until the problem is resolved/alleviated.

Figure 7:
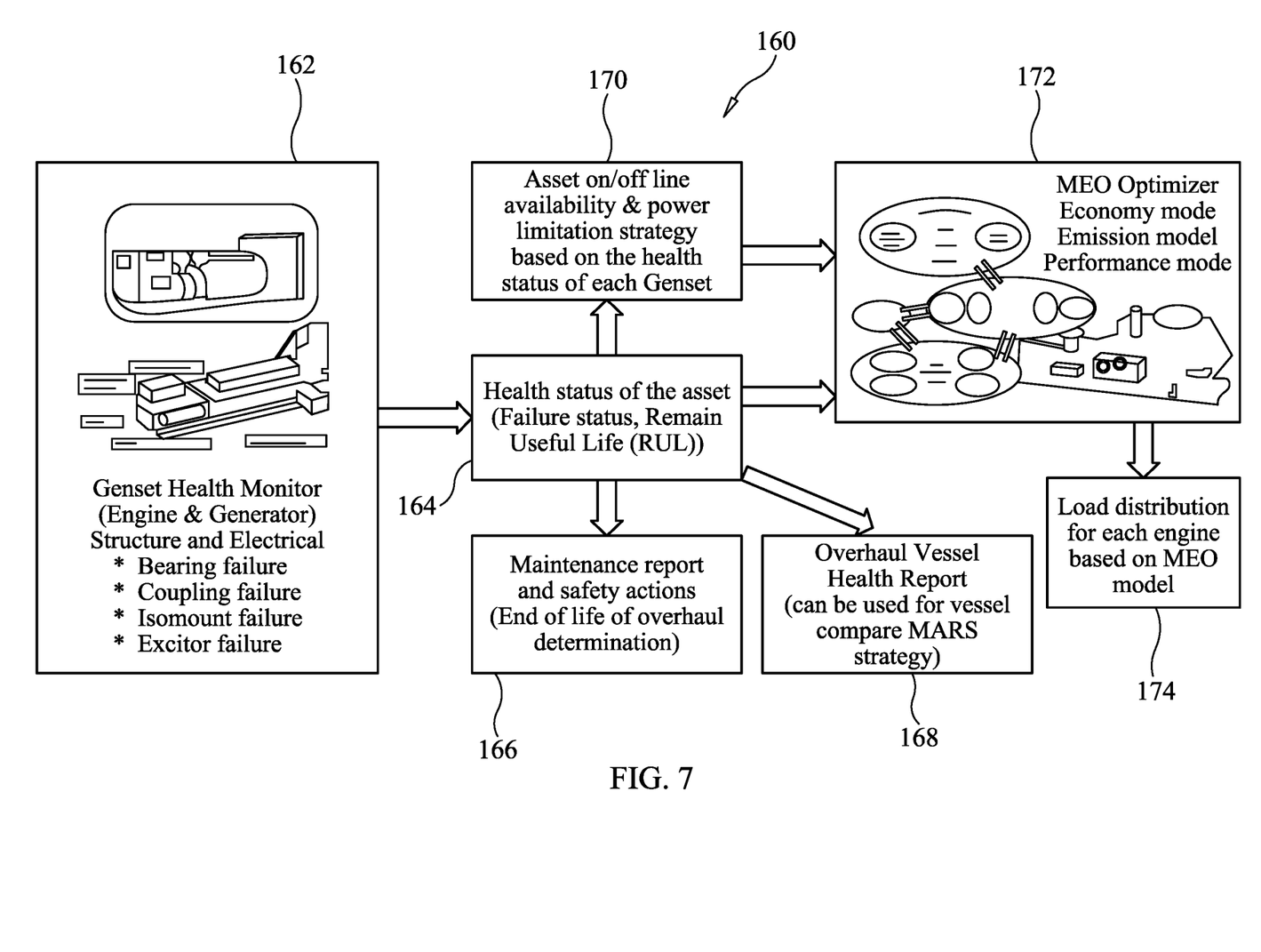
FIG. 7 is a block diagram of an exemplary health monitor system for a genset power system, including aspects of the system and method for detecting wear or failure of a genset coupling of the genset power system, as described herein.

An exemplary health monitor system 160 for a system incorporating a genset power system 10 is shown in FIG. 7. The health monitor system 160 may incorporate aspects of the system 28 and method of the present disclosure for detecting wear or failure of the coupling 18 of the genset power system 10. In particular, the health monitor system 160 may include a genset health monitor module 162, which may include the strategy of the present disclosure for detecting wear or failure of the coupling 18.

The genset health monitor module 162 may provide input to an asset health status module 164, which may calculate or determine the remaining useful life of system components. For example, the life prediction model may be calculated based on vibration sensor data and operating condition data, for example, using a structure analysis model. The vibration sensor data and the operating condition data may be obtained as described herein. The asset health status module 164 may provide input to a maintenance report and safety actions module 166 and an overall vessel health report module 168, both of which may provide useful information about system health and operation for analyzing the system monitored by the health monitor system 160.

The asset health status module 164 may also provide input to an asset availability and power limitation strategy module 170 and an optimizer module 172, both of which may optimize system operation based on the diagnostic or prognostic information received. The optimizer module 172 may look at how many assets are available and which one needs maintenance, with the health status module 164 providing this information. If the asset has a diagnostic code triggered (e.g., an identification of wear or failure of the coupling 18), the asset may be removed from the distribution list of assets for the optimizer module 172.

The optimizer module 172 may provide input to a load distribution module 174, which may optimize load sharing or load balancing based on various considerations, including, for example, economy, emissions, and performance. That is, the logic may look at the remaining useful life of each asset and may balance the load to extend the whole system life and avoid using one genset power system 10 all the time. Also, if one of the genset power systems 10 has a very low remaining useful life, the genset power system 10 will not be used as a higher priority genset power system 10 for power distribution determined by the optimizer module 172.

INDUSTRIAL APPLICABILITY

The present disclosure relates generally to genset power systems, also referred to as gensets. More particularly, the present disclosure relates to detection of wear or failure of a coupling of a genset power system. Yet further, the present disclosure is applicable to a system and method for using model-based detection, including machine learning, to detect the wear or failure.

Excessive loading, and/or other operating conditions, of a genset can cause vibrations, which may result in undesirable effects on components of the genset. For example, excessive loading may cause premature wear or failure of genset components, including a genset coupling, which may result in unplanned downtime of the genset. Thus, to optimize operation thereof, it may be desirable to accurately and effectively detect or predict the occurrence of various abnormal operating conditions of the genset, or particular components thereof, such that actions may be taken to reduce undesirable effects on the genset.

Referring generally to FIGS. 1-7, an exemplary genset power system 10 according to the present disclosure is shown generally in FIG. 1. The genset power system 10, which may be mounted on a vibration isolation mount 26, may include an engine 12 drivingly coupled to a generator 14. The engine 12 may include a plurality of cylinders, each having a piston connected to a common crankshaft 16. The engine 12, or crankshaft 16, may be mechanically coupled to the generator 14 via a coupling 18. The generator 14 may receive mechanical power from the engine 12, by way of the coupling 18, and convert at least a portion of the mechanical power into electrical power using a rotor 20. The generator 14 may also include a front bearing 22 and a rear bearing 24.

A system for detecting wear or failure of the coupling 18 of the genset power system 10 is shown generally at 28. The system 28 may include various sensors 30, including at least one vibration sensor 32, which may be configured to measure vibrations of the genset power system 10, and at least one additional sensor 33, which may include at least one of a speed sensor, temperature sensor, and pressure sensor configured to measure an operating condition of the genset power system 10. The system 28 may also include a control system 34, including a controller 36, for electronically monitoring and/or controlling the various machine systems and components. The control system 34 may include or access modeling software 44 for performing a variety of functions or tasks. For example, the modeling software 44 may be used to assist in detecting wear or failure of the coupling 18 of the genset power system 10. The control system 34 may also include or access a database 46. The database 46, and/or memory 40, may be accessed by the controller 36 to implement various monitoring and/or control strategies for the genset power system 10.

According to a specific example, the controller 36 may communicate with the vibration sensor 32 and the additional sensor 33, and may be programmed to identify wear or failure of the coupling 18, according to a method disclosed herein, the primary steps of which are illustrated in a flow diagram 90 of FIG. 4. Vibration sensor data may be generated by the vibration sensor 32 and operating condition data may be generated by the additional sensor 33, such as during operation of the genset power system 10, and may be received at the controller 36, at box 94. The operating condition data may be processed by the controller 36, at box 96, using the modeling software 44, which may be configured to perform any of the processing steps identified above, to generate simulated data. In particular, the modeling software 44 may generate a normal performance model and an abnormal performance model based on the operating condition data.

Turning now to box 98, time domain information of at least one of the simulated data and the vibration sensor data may be applied to the modeling software 44 using machine learning and/or pattern recognition. The machine learning or pattern recognition outputs may be applied to real-time model updates to increase the accuracy of the models 48 generated by the modeling software 44 for future calculations or predictions. That is, for example, the real-time simulated data and/or vibration sensor data may be processed, such as by using machine learning or pattern recognition, to generate data that may be used to update, or retrain, the models 48. At box 100, at least one of the following is compared: time domain information of the vibration sensor data to time domain information of the simulated data, which includes the normal performance model and the abnormal performance model; and frequency domain information of the vibration sensor data to frequency domain information of the simulated data, to identify wear or failure of the coupling 18. For either the time domain information or the frequency domain information, peak to peak values may be calculated and used for the comparisons.

As such, the diagnostics and prognostics of the present disclosure may be useful for early detection of issues and, thus, avoidance of catastrophic failure of components and systems, such as the coupling 18. The issues, or defects, including coupling wear or failure, may produce additional force that may be detected using sensors 30 positioned at mounting locations, as disclosed herein.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A system for detecting wear or failure of a genset coupling of a genset power system, the system including:
   the genset power system including an engine, a generator, and a coupling between the engine and the generator;
   a vibration sensor configured to measure vibrations of the genset power system;
   an additional sensor including one of a speed sensor, temperature sensor, and pressure sensor configured to measure an operating condition of the genset power system; and
   a controller configured to:
     receive vibration sensor data from the vibration sensor;
     receive operating condition data from the additional sensor;
     process the operating condition data using a modeling software to generate simulated data;
     apply time domain information of the simulated data and the vibration sensor data to the modeling software using a machine learning algorithm; and
     perform a comparison to identify the wear or failure of the coupling by comparing at least one of:
       time domain information of the vibration sensor data to time domain information of the simulated data, and
       frequency domain information of the vibration sensor data to frequency domain information of the simulated data.

2. The system of claim 1, wherein the modeling software generates a normal performance model and an abnormal performance model based on the operating condition data.

3. The system of claim 1, wherein the simulated data includes normal performance data and abnormal performance data,
   wherein the normal performance data indicates no wear or failure of the coupling,
   wherein the abnormal performance data indicates wear or failure of the coupling, and
   wherein the wear or failure of the coupling is identified when the vibration sensor data corresponds to the abnormal performance data.

4. The system of claim 1, wherein the controller is further configured to:
   filter the vibration sensor data using frequency-based filtering to obtain filtered vibration data;
   filter the simulated data using frequency-based filtering to obtain filtered simulated data; and
   compare the filtered vibration data to the filtered simulated data to identify the wear or failure of the coupling.

5. The system of claim 1, wherein the controller is further configured to generate and store a message corresponding to the wear or failure of the coupling when the time domain information of both the simulated data and the vibration sensor data or the frequency domain information of both the simulated data and the vibration data differ by a predetermined amount over a predetermined period of time.

6. The system of claim 1, further including a plurality of genset power systems, wherein the controller is further configured to apportion a particular amount of load to one genset power system of the plurality of genset power systems based on the wear or failure of the coupling.

7. The system of claim 1, further including a plurality of genset power systems, wherein the controller is further configured to set availability of one genset power system of the plurality of genset power systems based on the wear or failure of the coupling.

8. A method for detecting wear or failure of a genset coupling of a genset power system, wherein the genset power system includes an engine, a generator, and a coupling between the engine and the generator, the method including:
receiving, by a controller, vibration sensor data from a vibration sensor;
receiving, by the controller, operating condition data from an additional sensor that includes one of a speed sensor, temperature sensor, and pressure sensor;
processing, by the controller, the operating condition data using a modeling software to generate simulated data;
applying, by the controller, time domain information of the simulated data and the vibration sensor data to the modeling software using a machine learning algorithm; and
performing, by the controller, a comparison to identify the wear or failure of the coupling, wherein, when performing the comparison, the controller is to compare at least one of:
time domain information of the vibration sensor data to time domain information of the simulated data, and
frequency domain information of the vibration sensor data to frequency domain information of the simulated data.

9. The method of claim 8, further including:
generating a normal performance model and an abnormal performance model based on the operating condition data.

10. The method of claim 8, further including:
filtering the vibration sensor data using frequency-based filtering to obtain filtered vibration data;
filtering the simulated data using frequency-based filtering to obtain filtered simulated data; and
comparing the filtered vibration data to the filtered simulated data to identify the wear or failure of the coupling.

11. The method of claim 8, further including generating and storing a message corresponding to the wear or failure of the coupling when the time domain information of both the simulated data and the vibration sensor data or the frequency domain information of both the simulated data and the vibration sensor data differ by a predetermined amount over a predetermined period of time.

12. The method of claim 8, further including apportioning a particular amount of load to one genset power system of a plurality of genset power systems based on the wear or failure of the coupling.

13. The method of claim 8, further including setting availability of one genset power system of a plurality of genset power systems based on the wear or failure of the coupling.

14. The method of claim 8, wherein the simulated data includes normal performance data and abnormal performance data,
wherein the normal performance data indicates no wear or failure of the coupling,
wherein the abnormal performance data indicates wear or failure of the coupling, and
wherein the wear or failure of the coupling is identified when the vibration sensor data corresponds to the abnormal performance data.

15. A control system for detecting wear or failure of a genset coupling of a genset power system, wherein the genset power system includes an engine, a generator, and a coupling between the engine and the generator, the control system including:
a controller configured to:
receive vibration sensor data from a vibration sensor configured to measure vibrations of the genset power system;
receive operating condition data from an additional sensor configured to measure an operating condition of the genset power system; and;
process the operating condition data using a modeling software to generate simulated data;
apply time domain information of the simulated data and the vibration sensor data to the modeling software using a machine learning algorithm; and
perform a comparison to identify the wear or failure of the coupling, wherein, when performing the comparison, the controller is to compare at least one of:
time domain information of the vibration sensor data to time domain information of the simulated data, and
frequency domain information of the vibration sensor data to frequency domain information of the simulated data.

16. The control system of claim 15, wherein the controller is further configured to:
filter the vibration sensor data using frequency-based filtering to obtain filtered vibration data;
filter the simulated data using frequency-based filtering to obtain filtered simulated data; and
compare the filtered vibration data to the filtered simulated data to identify the wear or failure of the coupling.

17. The control system of claim 15, wherein the controller is further configured to generate and store a message corresponding to the wear or failure of the coupling when the time domain information of both the simulated data and the vibration sensor data or the frequency domain information of both the simulated data and the vibration sensor data differ by a predetermined amount over a predetermined period of time.

18. The control system of claim 15, wherein the controller is further configured to apportion a particular amount of load to one genset power system of a plurality of genset power systems based on the wear or failure of the coupling.

19. The control system of claim 15, wherein the controller is further configured to set availability of one genset power system of a plurality of genset power systems based on the wear or failure of the coupling.

20. The control system of claim 15, wherein the simulated data includes normal performance data and abnormal performance data,
wherein the normal performance data indicates no wear or failure of the coupling,
wherein the abnormal performance data indicates wear or failure of the coupling, and
wherein the wear or failure of the coupling is identified when the vibration sensor data corresponds to the abnormal performance data.

* * * * *